United States Patent
Cocciadiferro et al.

(10) Patent No.: US 11,709,080 B2
(45) Date of Patent: Jul. 25, 2023

(54) FLOW RATE ESTIMATION FOR MASS FLOW CONTROLLER

(71) Applicant: HORIBA STEC, Co., Ltd., Kyoto (JP)

(72) Inventors: Edward Cocciadiferro, Reno, NV (US); Patrick Lowery, Reno, NV (US)

(73) Assignee: HORIBA STEC, Co., Ltd., Kyoto (JP)

( * ) Notice: Subject to any disclaimer, the term of this patent is extended or adjusted under 35 U.S.C. 154(b) by 283 days.

(21) Appl. No.: 17/089,582

(22) Filed: Nov. 4, 2020

(65) Prior Publication Data

US 2021/0199480 A1 Jul. 1, 2021

Related U.S. Application Data

(60) Provisional application No. 62/953,803, filed on Dec. 26, 2019.

(51) Int. Cl.

| G01F 1/36 | (2006.01) |
| G06N 20/00 | (2019.01) |
| G01F 15/00 | (2006.01) |
| G01F 1/684 | (2006.01) |

(52) U.S. Cl.
CPC ............ *G01F 1/363* (2013.01); *G01F 1/684* (2013.01); *G01F 15/005* (2013.01); *G06N 20/00* (2019.01)

(58) Field of Classification Search
CPC .............. G01F 1/363; G01F 1/36; G01F 1/34

USPC ........................................................... 702/47
See application file for complete search history.

(56) References Cited

U.S. PATENT DOCUMENTS

| 2010/0108154 A1* | 5/2010 | Minami ............... G05D 11/132 137/88 |
| 2016/0033973 A1* | 2/2016 | Takijiri ................ G05D 7/0635 700/282 |
| 2019/0154539 A1* | 5/2019 | Banerjee ............. G01M 3/2807 |
| 2020/0264067 A1* | 8/2020 | Lance ....................... G01F 1/34 |
| 2020/0409321 A1* | 12/2020 | Sanchez Del Valle . H02J 3/381 |

* cited by examiner

*Primary Examiner* — Ricky Go
(74) *Attorney, Agent, or Firm* — Alleman Hall Creasman & Tuttle LLP

(57) ABSTRACT

A mass flow controller, including a block body having a flow path and a valve provided at least in part within the flow path. The mass flow controller may further include a valve position sensor, a first temperature sensor, a first pressure sensor located on an upstream side of the flow path from the valve, and a second pressure sensor located on a downstream side of the flow path from the valve. The mass flow controller may further include a processor configured to receive valve position data, first temperature data, first pressure data, and second pressure data. The processor may be further configured to estimate a flow rate of fluid in the flow path at least in part by applying a trained machine learning model to the valve position data, the first temperature data, the first pressure data, and the second pressure data.

20 Claims, 10 Drawing Sheets

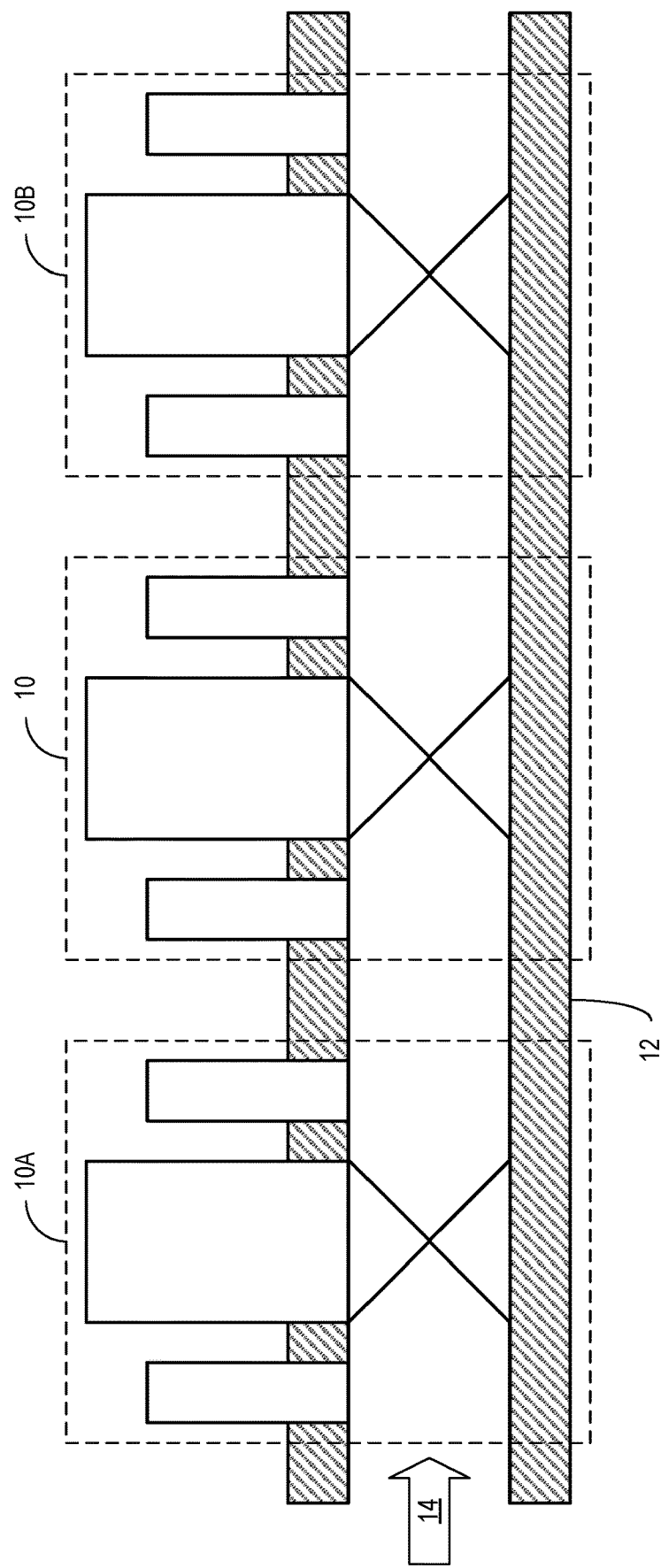

FLOW RATE ESTIMATION FOR MASS FLOW CONTROLLER

CROSS REFERENCE TO RELATED APPLICATIONS

This application claims priority to U.S. Provisional Patent Application Ser. No. 62/953,803, filed Dec. 26, 2019, the entirety of which is hereby incorporated herein by reference for all purposes.

BACKGROUND

Mass flow controllers are frequently used in applications such as semiconductor device manufacturing in which it is desirable to determine the amount of fluid flowing through the mass flow controller with a high level of accuracy. The flow rate is typically computed based on measured properties of the fluid and the valve rather than being measured directly. However, the dependency of the flow rate upon such properties may be complicated. For example, there may be regions of parameter space in which transitions between laminar and turbulent flow regimes occur. Thus, the flow rate of the fluid in the mass flow controller may be difficult to accurately estimate using previously existing methods.

SUMMARY

According to one aspect of the present disclosure, a mass flow controller is provided, including a block body having a flow path. The mass flow controller may further include a valve provided at least in part within the flow path of the block body. The mass flow controller may further include a valve position sensor, a first temperature sensor configured to detect a temperature of a fluid flowing in the flow path, a first pressure sensor located on an upstream side of the flow path from the valve, and a second pressure sensor located on a downstream side of the flow path from the valve. The mass flow controller may further include a processor configured to receive valve position data from the valve position sensor and receive first temperature data from the first temperature sensor. The processor may be further configured to receive, from the first pressure sensor, first pressure data for the fluid in the flow path, and receive, from the second pressure sensor, second pressure data for the fluid in the flow path. The processor may be further configured to estimate a flow rate of the fluid in the flow path at least in part by applying a trained machine learning model to the valve position data, the first temperature data, the first pressure data, and the second pressure data.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 6 shows an example calibration setup for the mass flow controller, according to the embodiment of FIG. 2.

DETAILED DESCRIPTION

Figure 1:
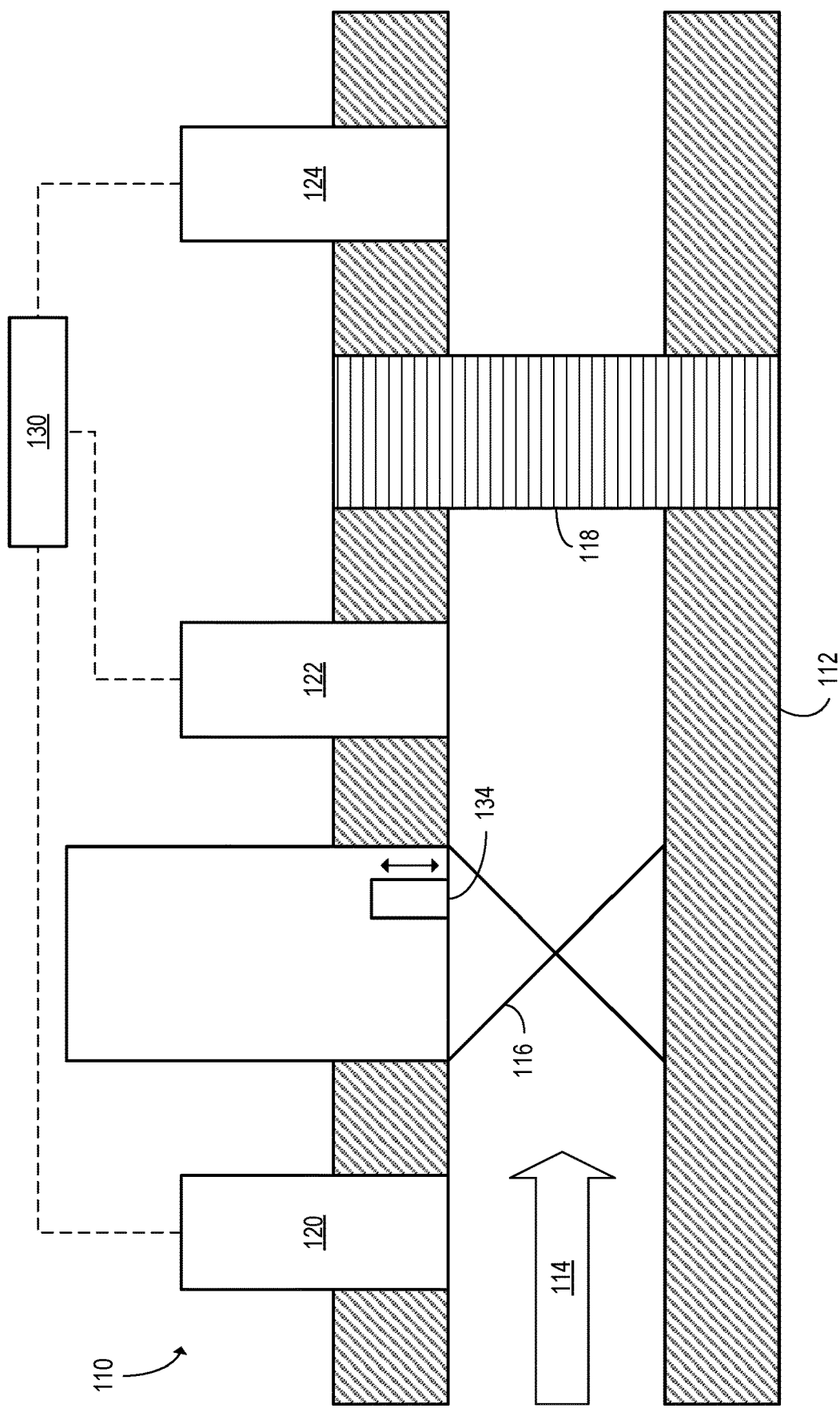
FIG. 1 shows an example of a conventional mass flow controller including a valve and a restrictor.

An example configuration of a conventional mass flow controller 110 is shown in FIG. 1. The mass flow controller 110 of FIG. 1 includes a block body 112 through which a flow path 114 is formed. In the example of FIG. 1, the fluid in the mass flow controller 110 flows along the flow path 114 from left to right. The conventional mass flow controller 110 further includes a valve 116 that is configured to be opened and closed to adjust an amount of fluid flowing through the mass flow controller 110. The valve 116 may be opened and closed by an actuator 134. In addition, the mass flow controller 110 includes a restrictor 118 configured to reduce the flow rate of the fluid. For example, the restrictor 118 may be configured to impose an upper bound on the flow rate. In the example of FIG. 1, the restrictor 118 is downstream of the valve 116.

The conventional mass flow controller 110 of FIG. 1 further includes a first pressure sensor 120, a second pressure sensor 122, and a third pressure sensor 124. The first pressure sensor 120 is located upstream of the valve 116 on the flow path 114. The second pressure sensor 122 is located between the valve 116 and the restrictor 118, and the third pressure sensor 124 is located downstream of the restrictor 118. The first pressure sensor 120, the second pressure sensor 122, and the third pressure sensor 124 may each transmit respective pressure measurements to a processor 130.

The processor 130 is configured to compute a flow rate estimate for the fluid based on the pressure measurements received from the first pressure sensor 120, the second pressure sensor 122, and the third pressure sensor 124. According to one conventional method for determining the flow rate, the processor 130 may input the pressure measurements into a polynomial regression formula with predetermined coefficients.

However, the conventional configuration of the mass flow controller 110 shown in FIG. 1 has potential drawbacks that may detrimentally affect its performance in some ultra-high-precision applications such as certain next-generation semiconductor manufacturing processes. The restrictor 118 of the mass flow controller 110 adds volume and dead space to the mass flow controller 110 in which fluid may become trapped. In addition, since the fluid has to pass through the restrictor 118 and the additional volume of the flow path 114 that accommodates the restrictor 118, the restrictor 118 may reduce the response time of the mass flow controller 110 when performing fast changes in flow rate. Including the restrictor 118 in the mass flow controller 110 may also increase the manufacturing complexity and cost of the mass flow controller 110 and may introduce an additional point of aging, failure, and/or performance degradation during mass flow controller operation.

Figure 2:
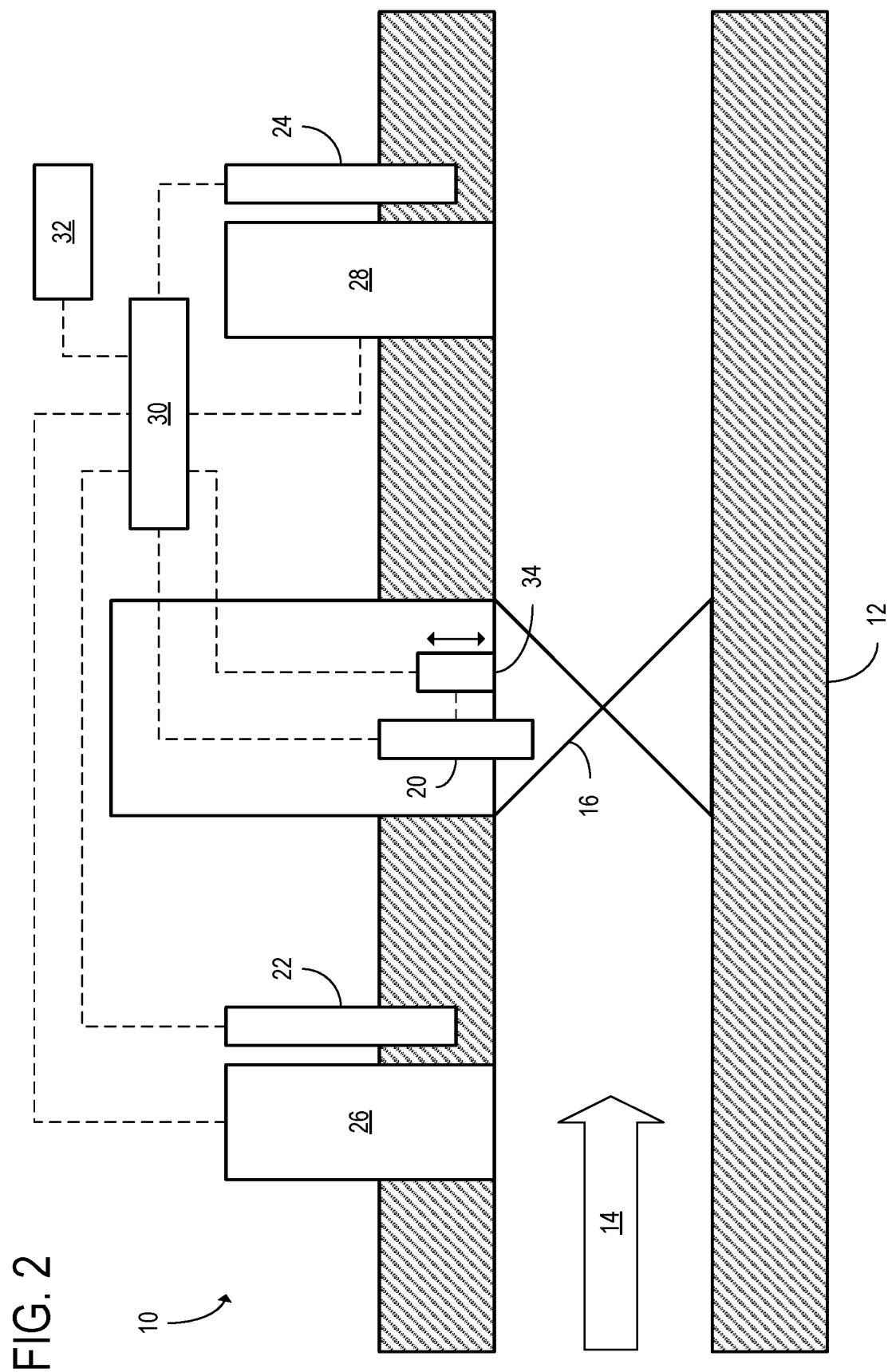
FIG. 2 shows an example mass flow controller including a valve and a processor, according to one example embodiment.

As an alternative to the mass flow controller 110 of FIG. 1, a mass flow controller 10 is shown in FIG. 2, according to one example embodiment of the present disclosure. The mass flow controller 10 of FIG. 2 includes a block body 12 having a flow path 14 that passes through it. As in FIG. 1, the flow path 14 is shown flowing from left to right in the example of FIG. 2. The mass flow controller 10 further includes a valve 16 provided at least in part within the flow path 14 of the block body 12. The valve 16 may be opened and closed to control the flow of the fluid along the flow path 14. However, unlike the conventional mass flow controller 110 of FIG. 1, the example mass flow controller 10 of FIG. 2 does not include the restrictor 118. Thus, the problems discussed above that result from using a restrictor may be avoided.

The mass flow controller 10 of FIG. 2 may further include a valve position sensor 20 configured to measure the degree to which the valve 16 is open or closed. The valve position sensor 20 may, for example, measure the valve position within a range between fully closed and fully open.

The mass flow controller 10 may further include a first pressure sensor 26 located on an upstream side of the flow path 14 from the valve 16. In addition, the mass flow controller 10 may further include a second pressure sensor 28 located on a downstream side of the flow path 14 from the valve 16. The first pressure sensor 26 and the second pressure sensor 28 may therefore be configured to measure a pressure differential that occurs across the valve 16. In some embodiments, a plurality of mass flow controllers sharing a common manifold may share a common downstream second pressure sensor 28.

The mass flow controller 10 may further include a first temperature sensor 22 configured to detect a temperature of the fluid flowing in the flow path 14. As shown in FIG. 2, the first temperature sensor 22 may be located on the upstream side of the flow path 14 from the valve 16. In some embodiments, the mass flow controller 10 may further include a second temperature sensor 24. The second temperature sensor 24 may be located on the downstream side of the flow path 14 from the valve 16. Thus, the first temperature sensor 22 and the second temperature sensor 24 may be configured to measure a temperature differential across the valve 16. The first temperature sensor 22 and the second temperature sensor 24 may each be located at least partially within the block body 12.

The mass flow controller 10 of FIG. 2 further includes a processor 30. In addition, the mass flow controller 10 may include memory 32 that is operatively coupled to the processor 30. In some embodiments, the processor 30 and the memory 32 may be physically integrated into the mass flow controller 10. Alternatively, the processor 30 and/or the memory 32 may be included in a separate physical computing device configured to communicate with components of the mass flow controller 10 via wired and/or wireless signals. The functions of the processor 30 and the memory 32 may, in some embodiments, be distributed between a plurality of communicatively coupled computing devices, which may include one or more client computing devices and/or one or more server computing devices.

Figure 3:
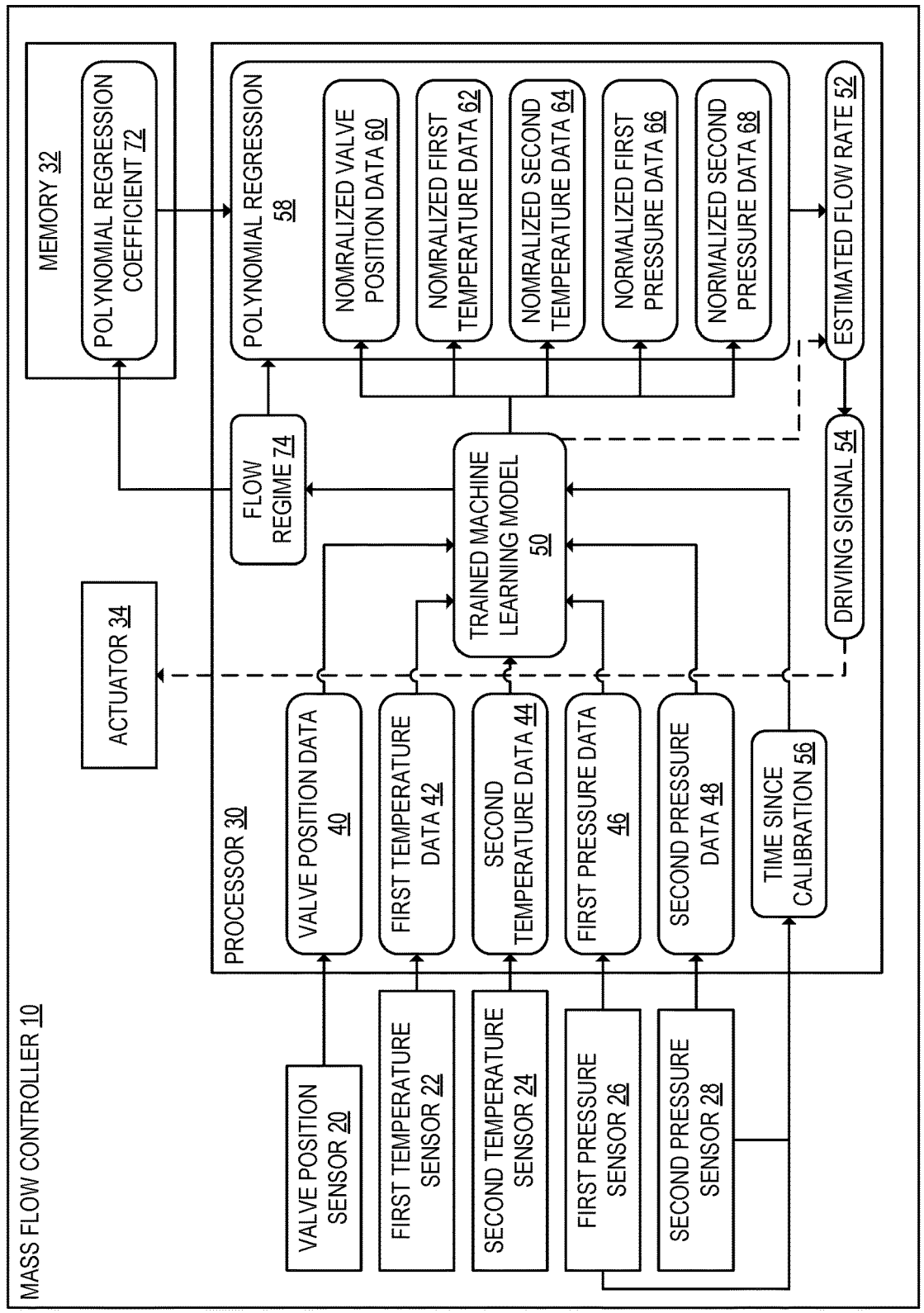
FIG. 3 schematically shows the processor of the mass flow controller when a trained machine learning model is executed, according to the embodiment of FIG. 2.

Each sensor included in the mass flow controller 10 may be configured to transmit its measurements to the processor 30, as shown in FIG. 3. The processor 30 may be configured to receive valve position data 40 from the valve position sensor 20. In addition, the processor 30 may be configured to receive first temperature data 42 from the first temperature sensor 22. In embodiments in which the mass flow controller 10 includes a second temperature sensor 24, the processor 30 may be further configured to receive second temperature data 44 from the second temperature sensor 24. In addition, the processor 30 may be further configured to receive first pressure data 46 from the first pressure sensor 26 and receive second pressure data 48 from the second pressure sensor 28 for the fluid in the flow path 14.

The processor 30 may be further configured to estimate a flow rate of the fluid in the flow path 14. Since the mass flow controller 10 does not include the restrictor 118 of the mass flow controller 110 shown in FIG. 1, the fluid flowing through the mass flow controller 10 of FIG. 2 may have a plurality of potential flow regimes. Thus, the dynamics of the fluid flowing through the mass flow controller 10 of FIG. 2 may be more complicated than for the mass flow controller 110 of FIG. 1. Modeling the flow rate of the fluid flowing through the mass flow controller 10 using only a polynomial regression may produce an inaccurate estimate of the flow rate.

Instead of using only polynomial regression to estimate the flow rate, the processor 30 may be configured to estimate the flow rate of the fluid in the flow path 14 at least in part by applying a trained machine learning model 50 to the valve position data 40, the first temperature data 42, the first pressure data 46, and the second pressure data 48. In embodiments in which the mass flow controller 10 includes a second temperature sensor 24, the processor 30 may be further configured to estimate the flow rate of the fluid in the flow path 14 at least in part by applying the trained machine learning model 50 to the second temperature data 44.

Figure 4:
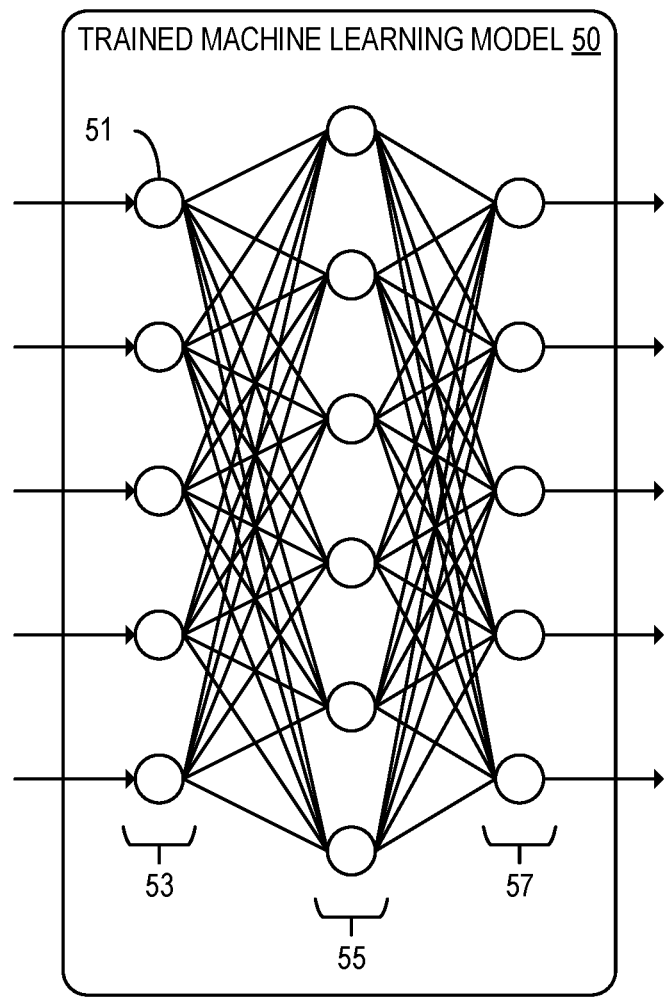
FIG. 4 schematically shows an example of the trained machine learning model, according to the embodiment of FIG. 2.

As shown in the example of FIG. 4, the trained machine learning model 50 may be a deep neural network including an input layer 53, one or more hidden layers 55, and an output layer 57. For example, the trained machine learning model 50 may be a cascade-forward neural network. As another example, the trained machine learning model 50 may be a convolutional neural network. Other types of machine learning models may alternatively be used. As shown in FIG. 4, the input layer 53, the output layer 57, and the one or more hidden layers 55 each include one or more neurons 51. Each neuron 51 of the trained machine learning model 50 may have a connection to neurons in other layers, and each connection between a pair of neurons in different layers may have an associated weight. In addition, each neuron 51 may have a respective bias value. In addition, each neuron 51 of the trained machine learning model 50 may have a respective transfer function. The transfer function for a neuron 51 of the trained machine learning model 50 may, for example, be a linear transfer function or a log-sigmoid transfer function. The transfer function determines whether and how much signal the neuron outputs given the sum of input signals to each neuron.

Returning to FIG. 3, the trained machine learning model 50 may be a regression model configured to output at least one scalar value. In some embodiments, the scalar value may be the estimated flow rate 52. In other embodiments, the scalar value may be an intermediate value to which the processor 30 may apply further processing to generate the estimated flow rate 52. For example, at the trained machine learning model 50, the processor 30 may be configured to determine normalized valve position data 60, normalized first temperature data 62, normalized first pressure data 66, and normalized second pressure data 68 from the valve position data 40, the first temperature data 42, the first pressure data 46, and the second pressure data 48. In embodiments in which the mass flow controller 10 includes a second temperature sensor 24, the processor 30 may be further configured to determine normalized second temperature data 64. The normalized valve position data 60, normalized first temperature data 62, normalized second temperature data 64, normalized first pressure data 66, and normalized second pressure data 68 may each be expressed as a dimensionless quantity such that computations performed on the normalized data do not result in expressions including terms with mismatched units. In one example, the values may be normalized to be values between 0 and 1.

In embodiments in which the trained machine learning model 50 is configured to generate normalized data, the processor 30 may be further configured to estimate the flow rate of the fluid in the flow path 14 at least in part by applying a polynomial regression 58 to the normalized valve position data 60, the normalized first temperature data 62, the normalized first pressure data 66, and the normalized second pressure data 68. In embodiments in which the processor 30 is further configured to generate normalized second temperature data 64, the processor 30 may be further configured to apply the polynomial regression 58 to the normalized second temperature data 64 when estimating the flow rate.

In some embodiments, the memory 32 may store one or more polynomial regression coefficients 72 of the polynomial regression 58. In such embodiments, the processor 30 may be further configured to estimate the flow rate of the fluid based at least in part on the one or more polynomial regression coefficients 72. For example, the one or more polynomial regression coefficients 72 may be coefficients of a Taylor series expansion. Additionally or alternatively, the memory 32 may store neural network coefficients when the trained machine learning model 50 is configured as a convolutional neural network.

In some embodiments, the trained machine learning model 50 may be configured to identify a flow regime 74 (such as laminar or turbulent) of the fluid in the flow path 14. The flow regime 74 may be selected from among a predetermined plurality of flow regimes 74. The processor 30 may, in such embodiments, be further configured to select the one or more polynomial regression coefficients 72 for the selected flow regime 74 from a plurality of potential sets of polynomial regression coefficients 72 corresponding to the plurality of flow regimes 74. Thus, in such embodiments, the trained machine learning model 50 may be a classification model configured to output a classification of the flow regime 74 rather than a regression model configured to output one or more scalar values corresponding to normalized sensor data.

In some embodiments, a time since calibration 56 of the first pressure sensor 26 and/or the second pressure sensor 28 may be used as an additional input for the trained machine learning model 50. Thus, the processor 30 may be further configured to estimate the flow rate based at least in part on the time since calibration 56 of at least one of the first pressure sensor 26 and the second pressure sensor 28. For example, some types of pressure sensors tend to drift in the same direction (toward higher or lower pressure measurements) over time following calibration. When such pressure sensors are used as the first pressure sensor 26 and/or the second pressure sensor 28, the trained machine learning model 50 may be configured to compute an adjustment to the first pressure data 46 and/or the second pressure data 48 based at least in part on the time since calibration 56 of one or both of the first pressure sensor 26 and the second pressure sensor 28.

As shown in FIG. 2, the valve 16 may further include an actuator 34 configured to change a position of the valve 16. Returning to FIG. 3, the processor 30 may be further configured to transmit a driving signal 54 to the actuator 34 based at least in part on the estimated flow rate 52. The actuator 34 may be configured to change the position of the valve 16 in response to receiving the driving signal 54. Thus, the processor 30 may be configured to control the position of the valve 16 based on the estimated flow rate 52.

Figure 5:
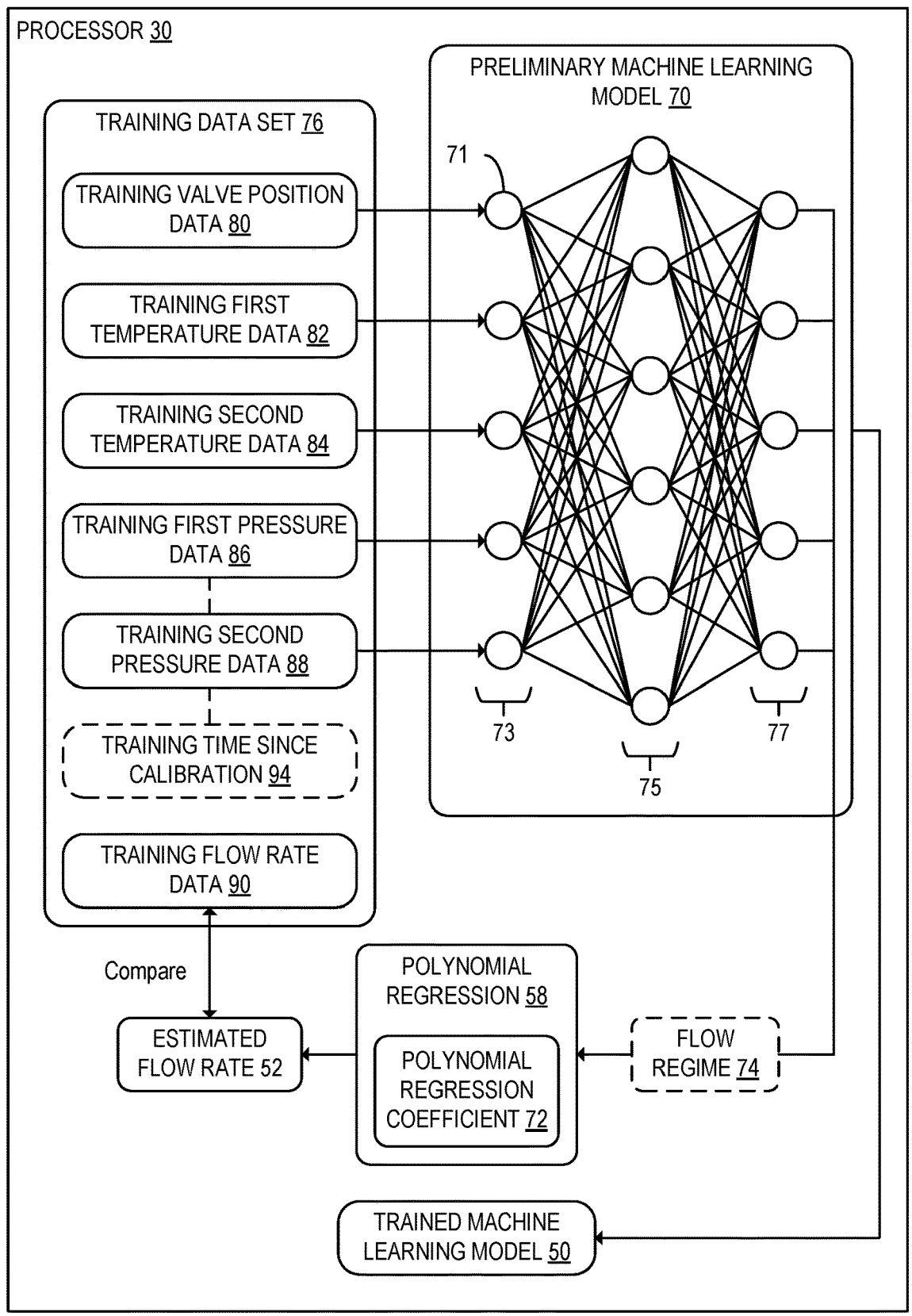
FIG. 5 schematically shows the training of the trained machine learning model, according to the embodiment of FIG. 2.

Turning now to FIG. 5, the training of the trained machine learning model 50 is depicted. The trained machine learning model 50 may be trained with a training data set 76 including training valve position data 80, training first temperature data 82, training first pressure data 86, training second pressure data 88, and training flow rate data 90. In embodiments in which the mass flow controller 10 includes a second temperature sensor 24, the training data set 76 may further include training second temperature data 84. The processor 30 may be configured to train the trained machine learning model 50 starting from a preliminary machine learning model 70 that has not yet been trained. The preliminary machine learning model 70 may, for example, be initialized with randomly selected weights. As another example, the initial weights may be normally distributed.

The processor 30 may be configured to use the training valve position data 80, training first temperature data 82, training first pressure data 86, and training second pressure data 88 as example inputs into an input layer of the preliminary machine learning model 70. The training second temperature data 84 may also be used as an example input in embodiments in which the mass flow controller 10 includes a second temperature sensor 24. The training valve position data 80, the training first temperature data 82, the training second temperature data 84, the training first pressure data 86, and the training second pressure data 88 may be received at respective neurons 71 included in an input layer 73 of the preliminary machine learning model 70. Each neuron 71 included in the input layer 73 may transmit an output value to a hidden layer 75 of the preliminary machine learning model 70, and each neuron 71 included in the hidden layer 75 may transmit an output value to another hidden layer 75 or to an output layer 77.

In embodiments in which the trained machine learning model 50 is configured to use the time since calibration of the first pressure sensor 26 and/or the second pressure sensor 28 as an input, the training data set 76 may further include a plurality of training times since calibration 94 for the first pressure sensor 26 and/or the second pressure sensor 28. In some embodiments, rather than directly inputting the plurality of training times since calibration 94 into one or more neurons 71 included in the input layer 73, the processor 30 may be configured to modify the training first pressure data 86 and/or the training second pressure data 88 using a predetermined correction function based on the training time since calibration 94 prior to inputting the training first pressure data 86 and/or the training second pressure data 88 into the preliminary machine learning model 70. For example, the correction function may be linear as a function of the training time since calibration 94.

The training flow rate data 90 may be used as example output data against which the processor 30 is further configured to compare the outputs of the preliminary machine learning model 70. In one example, backpropagation may be used to match the outputs of the preliminary machine learning model 70 to the training flow rate data 90. In such embodiments, an error function that compares the outputs of the preliminary machine learning model 70 to the training flow rate data 90, such as a mean squared error function, may be used. In addition, a predefined learning rate may be used when training the preliminary machine learning model 70 using backpropagation. In other embodiments, the processor 30 may be configured to use Bayesian regularization backpropagation. In embodiments in which the trained machine learning model 50 is configured to output normalized valve position data 60, normalized first temperature data 62, normalized first pressure data 66, and normalized second pressure data 68, the processor 30 may be further configured to apply the polynomial regression 58 to the output values of the preliminary machine learning model 70 to generate an estimated flow rate 52.

Alternatively, in embodiments in which the trained machine learning model 50 is configured to output a flow regime 74, the processor 30 may be further configured to apply a polynomial regression 58 including one or more polynomial regression coefficients 72 to the example inputs included in the training data set 76 to generate the estimated flow rate 52. In such embodiments, the processor 30 may select the one or more polynomial regression coefficients 72 that correspond to the identified flow regime 74. The processor 30 may be further configured to compare estimated flow rate 52 to the training flow rate data 90 and modify the neuronal weights of one or more neurons 71 included in the preliminary machine learning model 70 based on the results of the comparison.

Thus, by training the preliminary machine learning model 70 on the plurality of example inputs and outputs included in the training data set 76, the processor 30 may be configured to produce the trained machine learning model 50. Although FIG. 5 shows the training of the trained machine learning model 50 occurring at the processor 30 of the mass flow controller 10, the trained machine learning model 50 may alternatively be generated at one or more other processors included in one or more additional computing devices. In embodiments in which the trained machine learning model 50 is trained at one or more other computing devices, the trained machine learning model 50 may be loaded into the memory 32 of the mass flow controller 10 from the one or more other computing devices after training.

When a plurality of mass flow controllers 10 are manufactured, there may be small differences between the mass flow controllers 10 that would lead the estimated flow rates 52 of those mass flow controllers 10 to be inaccurate if the same trained machine learning model 50 and polynomial regression coefficients 72 were used for each mass flow controller 10. Thus, after a mass flow controller 10 is manufactured, the polynomial regression coefficients 72 for that mass flow controller 10 may be calibrated. Alternatively, additional training may be performed for the output layer 77 of the preliminary machine learning model 70. Thus, the manufacturer of the mass flow controller 10 may account for differences between components of individual mass flow controllers 10.

FIG. 6 shows an example calibration setup for the mass flow controller 10. In the example of FIG. 6, the mass flow controller 10 is arranged between an upstream mass flow controller 10A and a downstream mass flow controller 10B that have already been calibrated. Calibrating the polynomial regression coefficients 72 or the output layer 77 may, for example, include conveying fluid at a known flow rate into the flow path 14 of the mass flow controller 10. This fluid may be conveyed through the mass flow controller 10 by the upstream mass flow controller 10A located at the upstream end of the flow path 14. In addition, the pressure of the fluid in the flow path 14 may be set using the downstream mass flow controller 10B located at the downstream end of the flow path 14. Measurements of the respective pressures and/or temperatures upstream and downstream of the mass flow controller 10 may be taken at the upstream mass flow controller 10A and the downstream mass flow controller 10B. Thus, the flow rate of the fluid and the pressure differential across the valve 16 may be measured. and the estimated flow rate 52, the first pressure data 46, and the second pressure data 48 may be adjusted to match the known flow rate and pressure differential values.

Figure 7A:
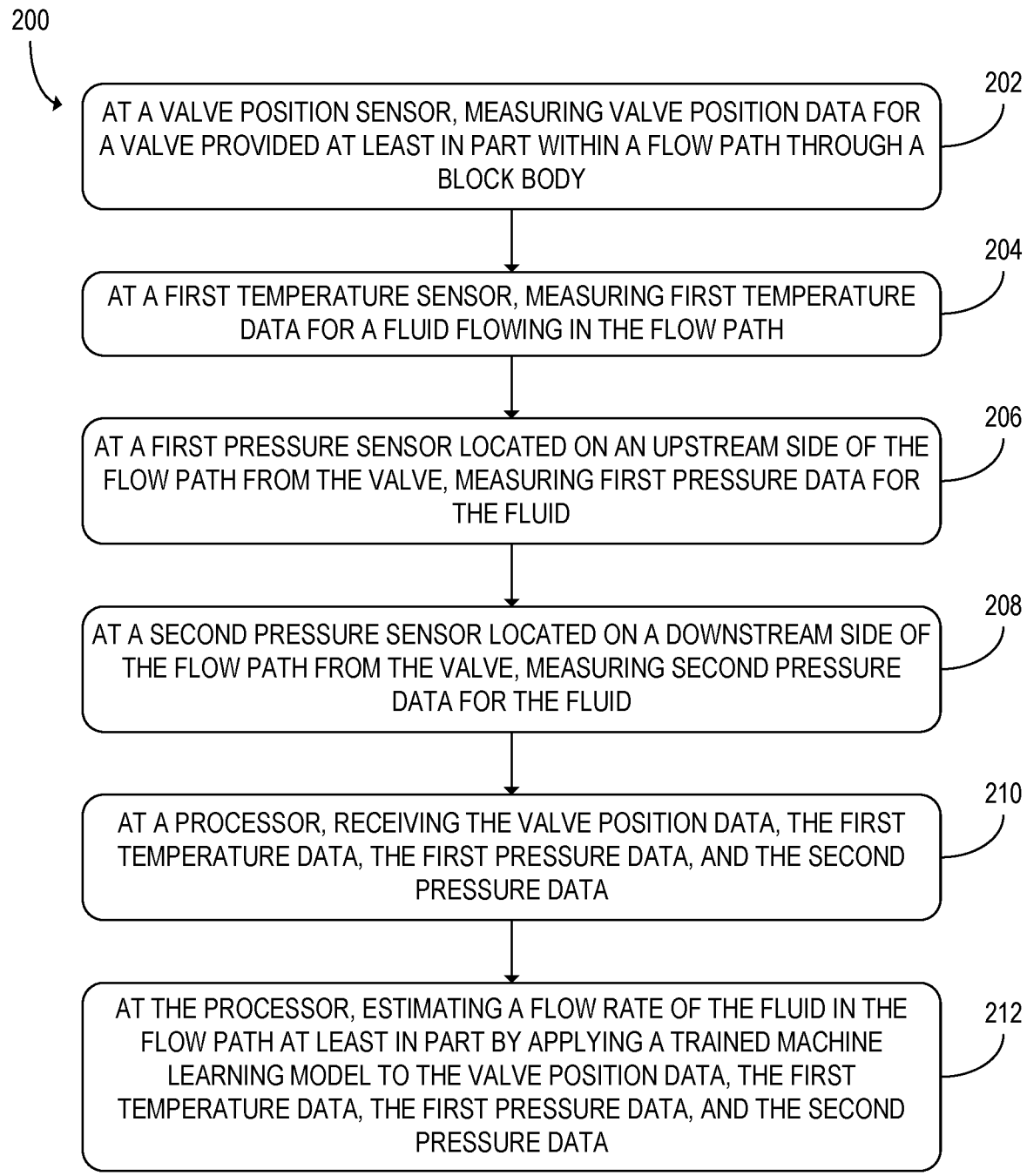
FIG. 7A shows a flowchart of an example method that may be performed at the mass flow controller of FIG. 2.

FIG. 7A shows a flowchart of an example method 200 for use with a mass flow controller. The method 200 may be used with the mass flow controller 10 of FIG. 2, or alternatively with some other mass flow controller. At step 202, the method 200 may include, at a valve position sensor, measuring valve position data for a valve provided at least in part within a flow path through a block body of the mass flow controller. At step 204, the method 200 may further include, at a first temperature sensor, measuring first temperature data for a fluid flowing in the flow path. At step 206, the method 200 may further include, at a first pressure sensor located on an upstream side of the flow path from the valve, measuring first pressure data for the fluid. At step 208, the method 200 may further include, at a second pressure sensor located on a downstream side of the flow path from the valve, measuring second pressure data for the fluid.

At step 210, the method 200 may further include receiving the valve position data, the first temperature data, the first pressure data, and the second pressure data at a processor. The processor may be physically integrated into the mass flow controller or may be located in a separate physical device communicatively coupled to the valve position sensor, the first temperature sensor, the first pressure sensor, and the second pressure sensor.

At step 212, the method 200 may further include estimating a flow rate of the fluid in the flow path at least in part by applying a trained machine learning model to the valve position data, the first temperature data, the first pressure data, and the second pressure data. In some embodiments, the estimation of the flow rate may be further based on a time since calibration of at least one of the first pressure sensor and the second pressure sensor. In some embodiments, the trained machine learning model may be a regression model configured to output at least one scalar value. For example, the at least one scalar value may be the estimated flow rate. In other embodiments, the trained machine learning model may be a classification model.

Figure 7B:
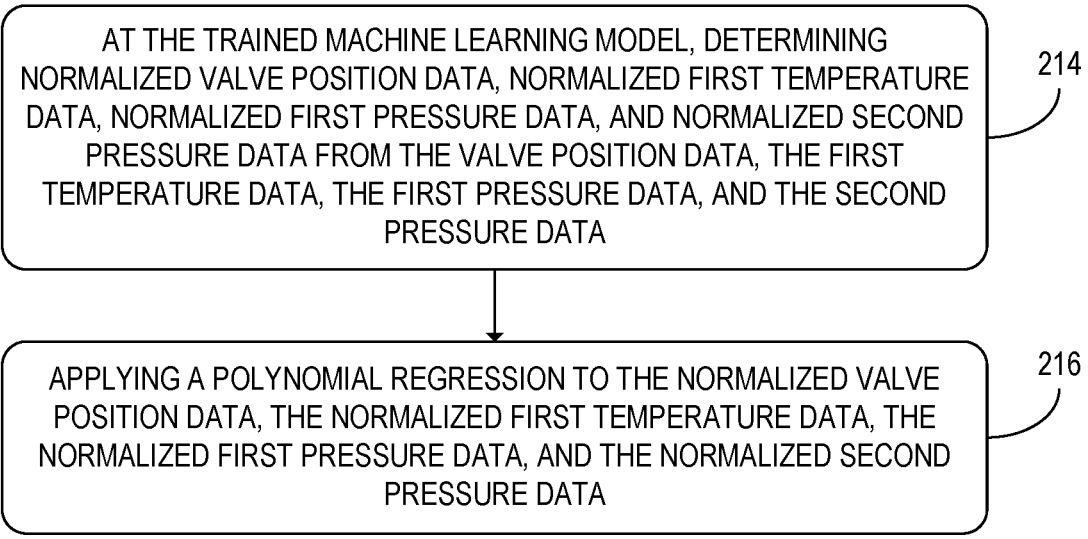
FIGS. 7B-E show additional steps of the method of FIG. 7A that may be performed in some embodiments.

FIG. 7B shows additional steps of the method 200 that may be performed to estimate the flow rate of the fluid when the trained machine learning model is a regression model configured to output one or more scalar values. The method 200 may include step 214, which includes, at the trained machine learning model, determining normalized valve position data, normalized first temperature data, normalized first pressure data, and normalized second pressure data from the valve position data, the first temperature data, the first pressure data, and the second pressure data. At step 216, the method 200 may further include applying a polynomial regression to the normalized valve position data, the normalized first temperature data, the normalized first pressure data, and the normalized second pressure data. Normalizing the valve position data, first temperature data, first pressure data, and second pressure data may make them usable as inputs for the polynomial regression without the terms of the best-fit polynomial having mismatched units.

Figure 7C:
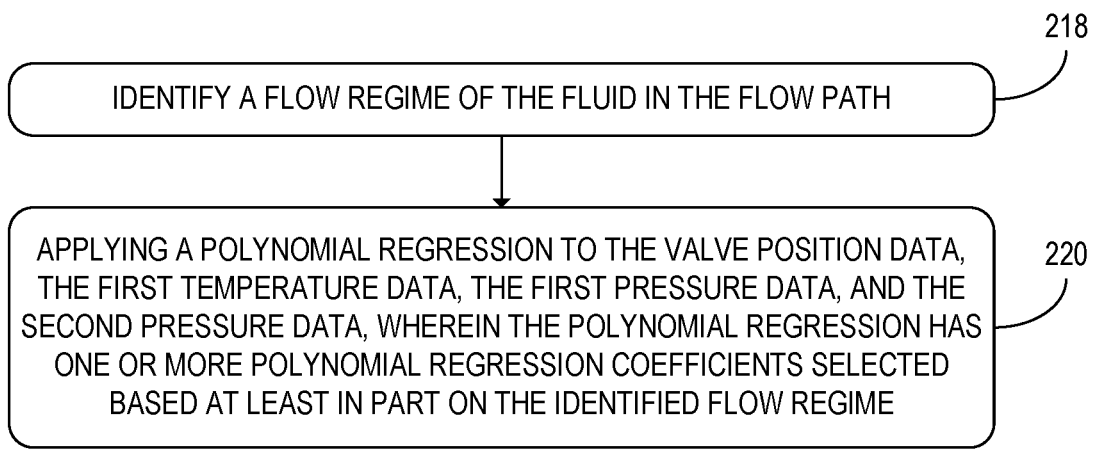

FIG. 7C shows additional steps of the method 200 that may be performed when the trained machine learning model is a classification model. At step 218, the trained machine learning model may be configured to identify a flow regime of the fluid in the flow path. The flow regime may be selected from a plurality of flow regimes. At step 220, the method 200 may further include applying a polynomial regression to the valve position data, the first temperature data, the first pressure data, and the second pressure data. The polynomial regression may have one or more polynomial regression coefficients selected based at least in part on the identified flow regime.

Figure 7D:
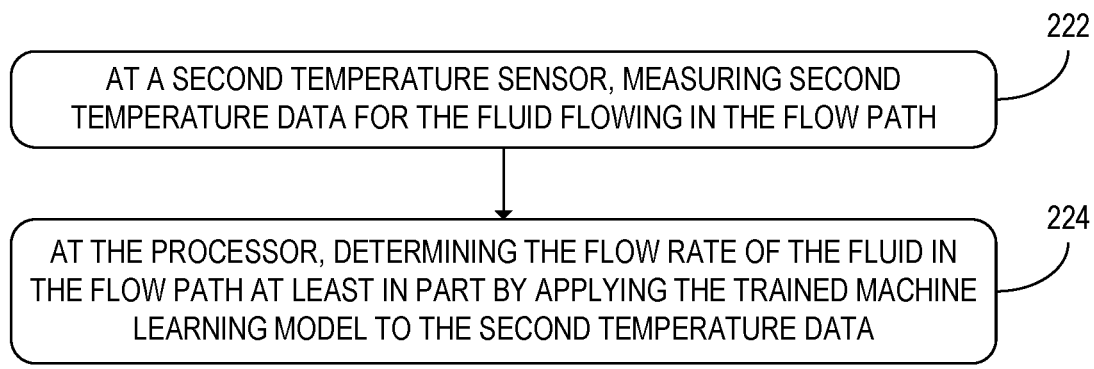

FIG. 7D shows additional steps of the method 200 that may be performed in some embodiments. At step 222, the method 200 may further include, measuring second temperature data for the fluid flowing in the flow path at a second temperature sensor. The first temperature sensor may be located on the upstream side of the flow path from the valve, and the second temperature sensor may be located on the downstream side of the flow path from the valve. Thus, the first temperature sensor and the second temperature sensor may measure a temperature differential across the valve. At step 224, the method 200 may further include, at the processor, estimating the flow rate of the fluid in the flow path at least in part by applying the trained machine learning model to the second temperature data. In embodiments in which the steps shown in FIG. 7B are performed, normalized second temperature data may be further determined at the trained machine learning model. In such embodiments, the polynomial regression may be further applied to the normalized second temperature data. Alternatively, in embodiments in which the steps of FIG. 7C are performed, the polynomial regression may be further applied to the second temperature data.

Figure 7E:
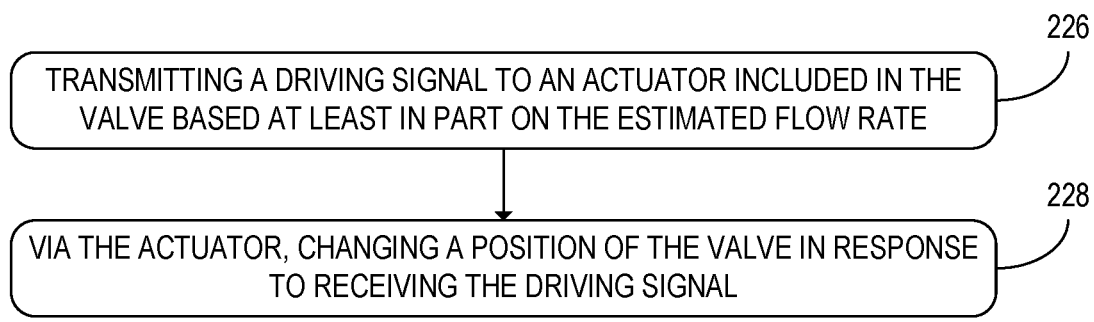

FIG. 7E shows additional steps that may be performed when performing the method 200. At step 226, the method 200 may further include transmitting a driving signal to an actuator included in the valve based at least in part on the estimated flow rate. At step 228, the method 200 may further include, via the actuator, changing a position of the valve in response to receiving the driving signal. Thus, the position of the valve may be adjusted based on the estimated flow rate.

With the systems and methods described above, the flow rate of a fluid flowing through a mass flow controller may be accurately estimated when the mass flow controller uses an adjustable valve as a restrictor rather than including a separate restrictor. By not including the separate restrictor, the cost and complexity of manufacturing the mass flow controller may be reduced. In addition, using the valve as the restrictor may allow adjustments to the flow rate of the fluid to be made more quickly than they could be made at a conventional mass flow controller. Using a trained machine learning model instead or in addition to polynomial regression when estimating the flow rate may allow the potentially more complicated fluid dynamics of this simplified mass flow controller configuration to be modeled.

In some embodiments, the methods and processes described herein may be tied to a computing system of one or more computing devices. In particular, such methods and processes may be implemented as a computer-application program or service, an application-programming interface (API), a library, and/or other computer-program product.

Figure 8:
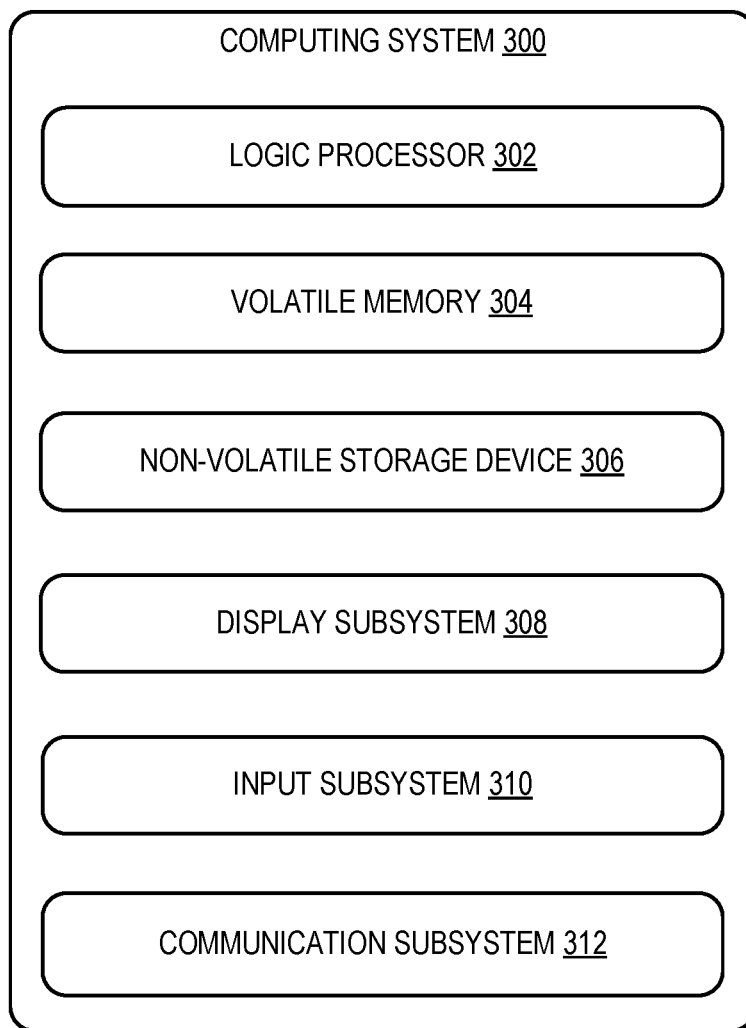
FIG. 8 shows a schematic view of an example computing environment in which the methods used with the mass flow controller of FIG. 2 may be enacted.

FIG. 8 schematically shows a non-limiting embodiment of a computing system 300 that can enact one or more of the methods and processes described above. Computing system 300 is shown in simplified form. Computing system 300 may embody the mass flow controller 10 described above and illustrated in FIG. 2. Computing system 300 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 300 includes a logic processor 302 volatile memory 304, and a non-volatile storage device 306. Computing system 300 may optionally include a display subsystem 308, input subsystem 310, communication subsystem 312, and/or other components not shown in FIG. 8.

Logic processor 302 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 302 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 306 includes one or more physical devices configured to hold instructions executable by the logic processors to implement the methods and processes described herein. When such methods and processes are implemented, the state of non-volatile storage device 306 may be transformed—e.g., to hold different data.

Non-volatile storage device 306 may include physical devices that are removable and/or built-in. Non-volatile storage device 306 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 306 may include nonvolatile, dynamic, static, read/write, read-only, sequential-access, location-addressable, file-addressable, and/or content-addressable devices. It will be appreciated that non-volatile storage device 306 is configured to hold instructions even when power is cut to the non-volatile storage device 306.

Volatile memory 304 may include physical devices that include random access memory. Volatile memory 304 is typically utilized by logic processor 302 to temporarily store information during processing of software instructions. It will be appreciated that volatile memory 304 typically does not continue to store instructions when power is cut to the volatile memory 304.

Aspects of logic processor 302, volatile memory 304, and non-volatile storage device 306 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 300 typically implemented in software by a processor to perform a particular function using portions of volatile memory, which function involves transformative processing that specially configures the processor to perform the function. Thus, a module, program, or engine may be instantiated via logic processor 302 executing instructions held by non-volatile storage device 306, using portions of volatile memory 304. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 308 may be used to present a visual representation of data held by non-volatile storage device 306. The visual representation may take the form of a graphical user interface (GUI). As the herein described methods and processes change the data held by the non-volatile storage device, and thus transform the state of the non-volatile storage device, the state of display subsystem 308 may likewise be transformed to visually represent changes in the underlying data. Display subsystem 308 may include one or more display devices utilizing virtually any type of technology. Such display devices may be combined with logic processor 302, volatile memory 304, and/or non-volatile storage device 306 in a shared enclosure, or such display devices may be peripheral display devices.

When included, input subsystem 310 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 312 may be configured to communicatively couple various computing devices described herein with each other, and with other devices. Communication subsystem 312 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 300 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A mass flow controller comprising:
a block body having a flow path;
a valve provided at least in part within the flow path of the block body;
a valve position sensor configured to measure a degree to which the valve is open or closed;
a first temperature sensor configured to detect a temperature of a fluid flowing in the flow path;
a first pressure sensor located on an upstream side of the flow path from the valve;
a second pressure sensor located on a downstream side of the flow path from the valve; and
a processor configured to:
 receive valve position data from the valve position sensor;
 receive first temperature data from the first temperature sensor;
 receive, from the first pressure sensor, first pressure data for the fluid in the flow path;
 receive, from the second pressure sensor, second pressure data for the fluid in the flow path; and
 estimate a flow rate of the fluid in the flow path at least in part by applying a trained machine learning model to the valve position data, the first temperature data, the first pressure data, and the second pressure data, wherein
the trained machine learning model is trained with a training data set including training valve position data, training temperature data, training pressure data, and training flow rate data.

2. The mass flow controller of claim 1, wherein the trained machine learning model is a regression model configured to output at least one scalar value.

3. The mass flow controller of claim 2, wherein the processor is further configured to:
at the trained machine learning model, determine normalized valve position data, normalized first temperature data, normalized first pressure data, and normalized second pressure data from the valve position data, the first temperature data, the first pressure data, and the second pressure data; and
estimate the flow rate of the fluid in the flow path at least in part by applying a polynomial regression to the normalized valve position data, the normalized first temperature data, the normalized first pressure data, and the normalized second pressure data.

4. The mass flow controller of claim 3, further comprising memory storing one or more coefficients of the polynomial regression, wherein the processor is further configured to estimate the flow rate of the fluid based at least in part on the one or more coefficients.

5. The mass flow controller of claim 1, further including a second temperature sensor located in the block body on the downstream side of the flow path from the valve, wherein:
the first temperature sensor is located on the upstream side of the flow path from the valve; and
the processor is further configured to:
receive second temperature data from the second temperature sensor; and
estimate the flow rate of the fluid in the flow path at least in part by applying the trained machine learning model to the second temperature data.

6. The mass flow controller of claim 5, wherein the processor is further configured to:
at the trained machine learning model, determine normalized second temperature data; and
determine the flow rate of the fluid in the flow path at least in part by applying a polynomial regression to the second temperature data.

7. The mass flow controller of claim 1, wherein the trained machine learning model is a cascade-forward neural network or a convolutional neural network.

8. The mass flow controller of claim 1, wherein the trained machine learning model is configured to identify a flow regime of the fluid in the flow path.

9. The mass flow controller of claim 1, wherein:
the training temperature data is training first temperature data; and
the training pressure data includes training first pressure data and training second pressure data.

10. The mass flow controller of claim 1, wherein:
the processor is further configured to transmit a driving signal to an actuator included in the valve based at least in part on the estimated flow rate; and
the actuator is configured to change a position of the valve in response to receiving the driving signal.

11. The mass flow controller of claim 1, wherein the processor is further configured to estimate the flow rate based at least in part on a time since calibration of at least one of the first pressure sensor and the second pressure sensor.

12. The mass flow controller of claim 1, wherein the first temperature sensor is located within a wall of the block body.

13. A method for use with a mass flow controller, the method comprising:
at a valve position sensor, measuring valve position data for a valve provided at least in part within a flow path through a block body, wherein the valve position sensor is configured to measure a degree to which the valve is open or closed;
at a first temperature sensor, measuring first temperature data for a fluid flowing in the flow path;
at a first pressure sensor located on an upstream side of the flow path from the valve, measuring first pressure data for the fluid;
at a second pressure sensor located on a downstream side of the flow path from the valve, measuring second pressure data for the fluid; and
at a processor:
receiving the valve position data, the first temperature data, the first pressure data, and the second pressure data; and
estimating a flow rate of the fluid in the flow path at least in part by applying a trained machine learning model to the valve position data, the first temperature data, the first pressure data, and the second pressure data, wherein
the trained machine learning model is trained with a training data set including training valve position data, training temperature data, training pressure data, and training flow rate data.

14. The method of claim 13, wherein the trained machine learning model is a regression model configured to output at least one scalar value.

15. The method of claim 14, wherein estimating the flow rate of the fluid in the flow path includes:
at the trained machine learning model, determining normalized valve position data, normalized first temperature data, normalized first pressure data, and normalized second pressure data from the valve position data, the first temperature data, the first pressure data, and the second pressure data; and
applying a polynomial regression to the normalized valve position data, the normalized first temperature data, the normalized first pressure data, and the normalized second pressure data.

16. The method of claim 13, further comprising:
at a second temperature sensor, measuring second temperature data for the fluid flowing in the flow path; and
at the processor, estimating the flow rate of the fluid in the flow path at least in part by applying the trained machine learning model to the second temperature data.

17. The method of claim 16, wherein:
the first temperature sensor is located on the upstream side of the flow path from the valve; and
the second temperature sensor is located on the downstream side of the flow path from the valve.

18. The method of claim 13, wherein:
the training temperature data is training first temperature data; and
the training pressure data includes training first pressure data and training second pressure data.

19. The method of claim 13, further comprising:
transmitting a driving signal to an actuator included in the valve based at least in part on the estimated flow rate; and
via the actuator, changing a position of the valve in response to receiving the driving signal.

20. A mass flow controller comprising:
a block body having a flow path;
a valve provided at least in part within the flow path of the block body;
a valve position sensor;
a first temperature sensor configured to detect a temperature of a fluid flowing in the flow path;
a first pressure sensor located on an upstream side of the flow path from the valve;
a second pressure sensor located on a downstream side of the flow path from the valve;
memory storing one or more polynomial regression coefficients; and
a processor configured to:
receive valve position data from the valve position sensor;

receive first temperature data from the first temperature sensor;
receive, from the first pressure sensor, first pressure data for the fluid in the flow path;
receive, from the second pressure sensor, second pressure data for the fluid in the flow path; and
at a trained machine learning model, determine normalized valve position data, normalized first temperature data, normalized first pressure data, and normalized second pressure data from the valve position data, the first temperature data, the first pressure data, and the second pressure data; and
determine a flow rate of the fluid in the flow path at least in part by applying a polynomial regression with the one or more polynomial regression coefficients to the normalized valve position data, the normalized first temperature data, the normalized first pressure data, and the normalized second pressure data.

* * * * *